(12) United States Patent
Stubing

(10) Patent No.: US 6,363,141 B1
(45) Date of Patent: Mar. 26, 2002

(54) METHOD AND APPARATUS FOR PROCESSING CHARGES FOR A COMMUNICATION

(75) Inventor: Richard A. Stubing, West Long Branch, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/421,653

(22) Filed: Oct. 20, 1999

(51) Int. Cl.⁷ ............................................. H04M 15/00
(52) U.S. Cl. ............ 379/116; 379/114.03; 379/114.05; 379/120
(58) Field of Search ................... 379/111, 112, 379/114, 115, 116, 120, 121, 124, 126, 127, 196, 197, 207, 183, 154, 119

(56) References Cited

U.S. PATENT DOCUMENTS 5,805,680 A * 9/1998 Penzias ....................... 379/118
6,011,837 A * 1/2000 Malik ......................... 379/112
6,266,401 B1 * 7/2001 Marchbanks et al. ....... 379/116

* cited by examiner

*Primary Examiner*—Binh Tieu
(74) *Attorney, Agent, or Firm*—Oliff & Berridge

(57) ABSTRACT

An apparatus and method for automatically processing charges on a billing system for a telecommunications communication is provided. The type of communication is automatically determined from a received record. Based on the determined type of communication, information indicating attributes of the communication is retrieved from the record. A bill is then generated that includes at least one new section that is generated exclusively from the information retrieved from the record. The new section includes information about communications to new services. The billing system does not have to be extensively reconfigured when a new special service is offered on a trial basis.

14 Claims, 5 Drawing Sheets

| Date | Time | Call Duration | Originating Number | Terminating Number | Service Identifier | Section Heading | Service Code | Cost | ... |
|---|---|---|---|---|---|---|---|---|---|
| 310 | 320 | 330 | 340 | 350 | 360 | 370 | 380 | 390 | |

METHOD AND APPARATUS FOR PROCESSING CHARGES FOR A COMMUNICATION

BACKGROUND OF THE INVENTION

1. Field of Invention

The present invention is directed to a method and apparatus for automatically processing charges for a telecommunication communication.

2. Description of Related Art

Presently, existing systems generate bills for telecommunication communications based on predetermined bill structures. A billing system must be extensively retooled to accommodate a new telecommunication service. This retooling must be done to allow a billing system to recognize when a received billing record is for a communication to the new service. This retooling must also be done to allow a billing system to generate appropriate sections in a bill for new services.

The retooling can be especially problematic when a new service is only being offered on a trial basis or for a limited time. The limited nature of the new service may not warrant the expense and time of retooling the billing system. Possible solutions have included issuing special calling cards or billing customers' credit cards for the special service. These solutions are not optimal because they require a customer to keep track of numerous bills for communication services. Thus, there is a need for new technology to automatically generate bills or sections on bills for communications to new special services that may be offered on a trial basis.

SUMMARY OF THE INVENTION

The invention provides an apparatus and method for the automatic processing of charges for a telecommunications communication. The type of communication is automatically determined from a received record. Based on the determined type of communication, information indicating attributes of the communication is retrieved from the record. A bill is then generated that includes at least one new section that is generated exclusively from the information retrieved from the record. The new section includes information about communications to new services. Accordingly, the existing billing system does not have to be extensively reconfigured when a new special service is offered on a trial basis.

These and other features and advantages of this invention are described in or are apparent from the following detailed description of the preferred embodiments.

BRIEF DESCRIPTION OF THE DRAWINGS

The preferred embodiments of the present invention will be described with reference to the following figures, wherein like numerals designate like elements, and wherein:

FIG. 3 illustrates an example data structure of a record employed by one embodiment of the service processing unit of FIG. 1;

DETAILED DESCRIPTION OF PREFERRED EMBODIMENTS

Figure 1:
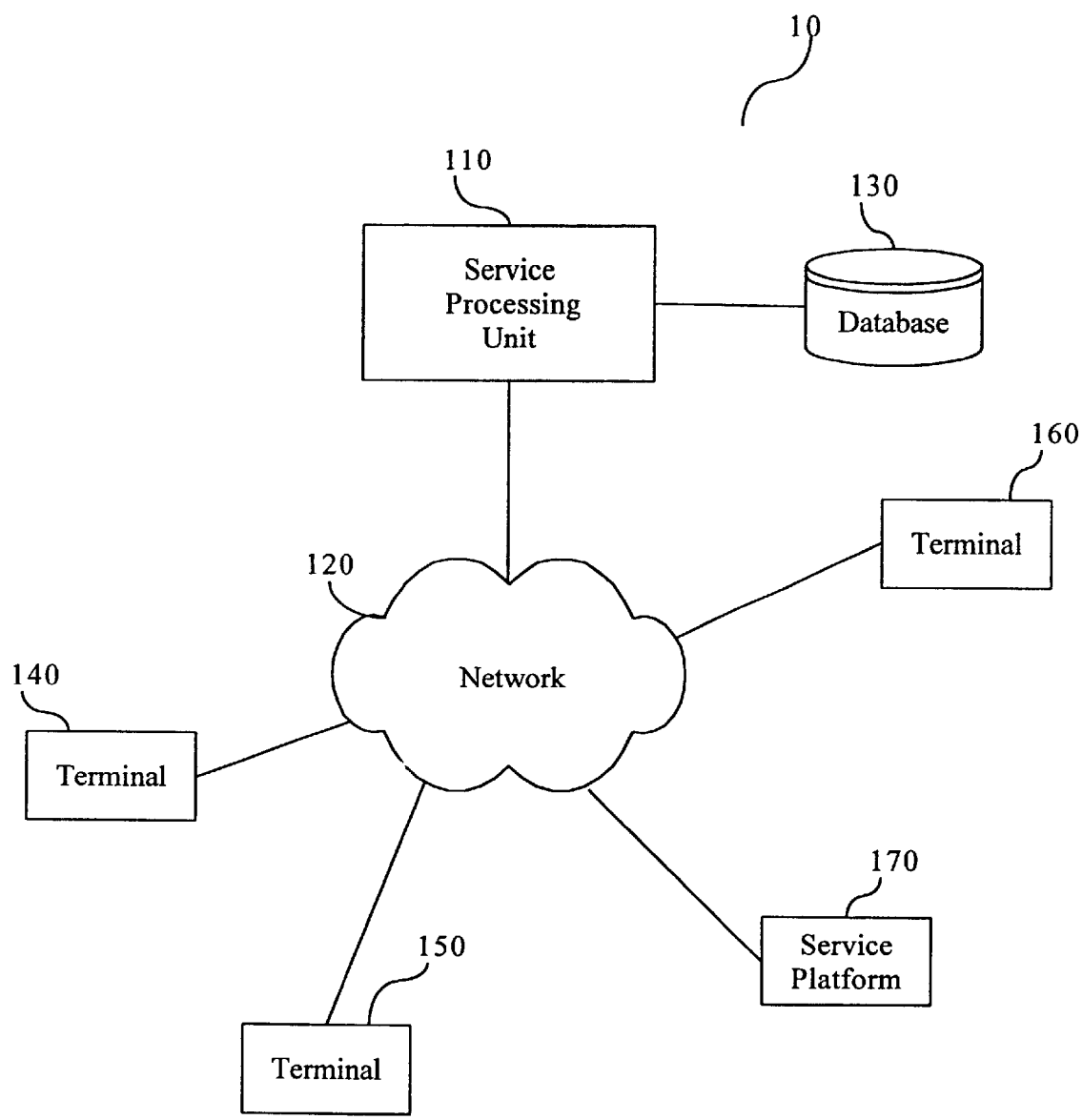
FIG. 1 is an exemplary block diagram of a system according to a first embodiment.

FIG. 1 is an exemplary block diagram of a system 10 according to one embodiment of the invention. The system 10 may include a service processing unit 110, a network 120, a database 130, one or more terminals 140, 150 and 160 and at least one service platform 170. Terminals 140, 150 and 160 may include telephones, wireless telephones, cellular telephones, PDAs, computer terminals, pagers, fax machines, answering machines or any other device that is capable of sending and receiving data.

The service processing unit 110 may be connected to a network. The network 120 may include any type of network that is capable of sending and receiving communication signals. For example, the network 120 may include a data network, such as the Internet, an Intranet, a local area network (LAN), a wide area network (WAN), and other like communication systems. The network 120 may also include a telecommunications network, such as a local telephone network, long distance telephone network, cellular telephone network, satellite communications network, and other like communications systems. Furthermore, the network 120 may include more than one network and may include a plurality of different types of networks. Thus, the network 120 may include a plurality of data networks, a plurality of telecommunications networks, a combination of data and telecommunications networks and other like communication systems.

Communication signals are received by the network 120 and are routed in the network 120 by way of, for example, routers and switches (not shown) to a destination terminal for receiving the communication signals. The routing may be performed by switches, such as Lucent Technologies Inc. 5ESS and 4ESS switches, for example, which are generally known in the art.

Service platform 170 provides services to terminals 140, 150 and 160 using the network 120. The service platform may gather call information for each terminal 140, 150 and 160 that uses its services. However, the service platform may not access all call information.

The service processing unit 110 may be an independent unit coupled to the network 120 (as shown), or it may be distributed throughout the network 120. For example, the service processing unit 110 may be made part of various central offices or servers employed by the network 120 which are distributed throughout the network 120. Any configuration that permits the generation of records for calls placed over the network 120 and/or billing for the calls placed over the network 120 may be used without departing from the spirit and scope of the present invention.

When a calling party uses a terminal 140, for example, that requires the services of the service platform 170 or the call is directed to the service platform 170 across the network 120, the communication signals are routed via the network 120 to the service platform 170. The service processing unit 110 may monitor the network usage and may generate a record that includes information regarding the use of the service platform 170. The record may include codes and data that correspond to the particular use of service platform 170. The service processing unit may then utilize the record in the generation of a bill that includes charges for the use of the service platform 170.

Figure 2:
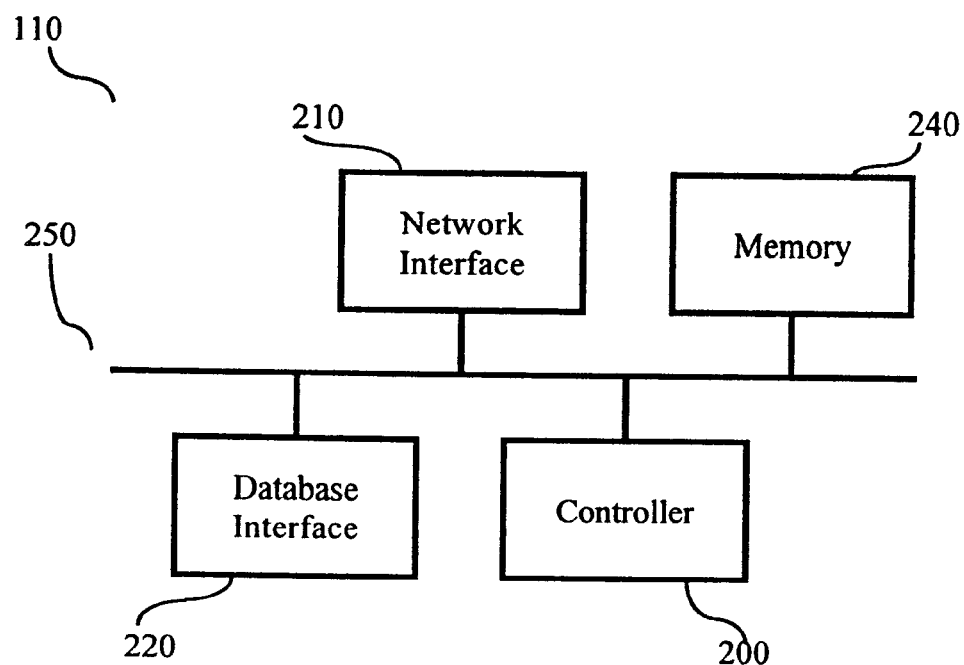
FIG. 2 is an exemplary block diagram of the service processing unit of FIG. 1.

FIG. 2 is an exemplary block diagram of the service processing unit 110 which includes a controller 200, a network interface 210, a database interface 220, and a memory 240. The above components are coupled together through a signal bus 250. The database 130 may be stored in either the memory 240, such as in a local hard disk, or in other storage devices that are in communication with the service processing unit 110 through the database interface 220.

The controller 200 may control the input/output of communications signals and records through the interfaces 210 and 220, may retrieve database information from the database 130 through the database interface 220 and/or the memory 240 based on communication signals and records received through the network interface 210, and may generate additional records, charges and bills based on the database information and information retrieved from the records.

When charges are to be processed for a telecommunications communication, the controller 200 may receive a record for a completed call to a special service across the network 120. The special service may be a new service that is offered on a trial basis for a limited time. The controller 200 may additionally identify the record as a record for a completed call to the special service. The record may be identified as a record for a call to the special service without prior notification that the special service is being offered. For example, the service processing unit 110 may have no information about the new special service aside from the information provided in the record. The record may further be identified as a call to a special service based on information located in a special service identifier field located within the record.

The controller 200 may also retrieve billing-related information from the record corresponding to characteristics of the completed call. The billing-related information may include a special service identifier, a section heading identifier, a cost of a completed call, or the like. The controller 200 may additionally generate a new section on a bill, the new section may include identification information that identifies the completed call as a call to the special service and may include billing-related information. The new section on the bill may further include the section heading identifier as a section heading on the bill. The new section on the bill may also include the cost of the completed call in a cost column on the bill. Accordingly, the new section may include any and all information that may be useful for billing a customer for a new special service.

FIG. 3 illustrates an example data structure of a record 300 employed by one embodiment of the service processing unit 110. The record 300 may include a date field 310 which may indicate the date on which a call was placed; a time field 320 which may indicate the time of day when the call was placed; a call duration field 330 which may indicate the length of the call; an originating number field 340 which may indicate a terminal from which a call was placed; a terminating number field 350 which may indicate a destination terminal to which a call was placed; and a service identifier field 360 which may comprise a service name or other designation of a service used for or during a call. The service identifier field 360 may additionally comprise a flag that indicates that the record 300 is directed to a call to a special service. The record 300 may also include a section heading field 370 which may indicate a section heading to be used on a bill to designate a label for the section associated with specific calls to a special service; a service code field 380 which may indicate a service code or other alphanumeric identifier associated with a call to a special service; and a cost field 390 which may indicate a fixed or variable cost associated with a call to a special service. The record 300 does not require all of the above-described fields to be utilized by the service processing unit 110. Furthermore, the record 300 may include additional fields which may be useful for designating information relating to a call and information useful for identifying a call as one to a special service.

Figure 4:
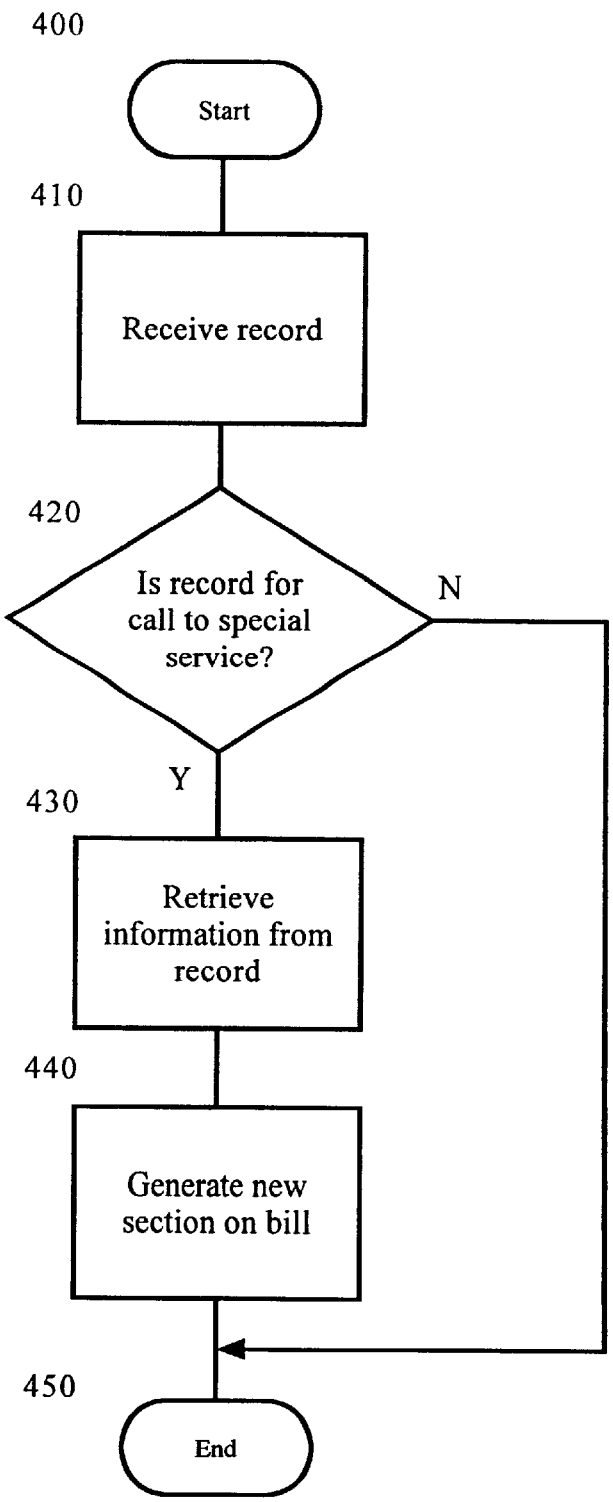
FIG. 4 is an exemplary flowchart outlining the operation of one embodiment of the service processing unit of FIG. 1.

FIG. 4 is an exemplary flowchart outlining the operation of one embodiment of the service processing unit 110 of FIG. 1. Once the service processing unit 110 is initiated in step 400, the controller 200 may receive a record for a completed call across the network 120 in step 410. The controller 200 may also generate a record for a completed call instead of receiving the record in step 410. In step 420 the controller 200 determines if the record is for a completed call to a new or trial special service. If the call is not a call to a special service, the controller ends special service related analysis in step 450. However, if the call is a completed call to a new or trial special service, the controller 200 advances to step 430. In step 430, the controller 200 retrieves billing-related information from the record corresponding to characteristics of the completed call. In step 440, the controller 200 generates a new section on a bill which includes identification information that identifies the completed call as a call to the special service and includes billing-related information. In step 450, the controller 200 ends special service related analysis.

Figure 5:
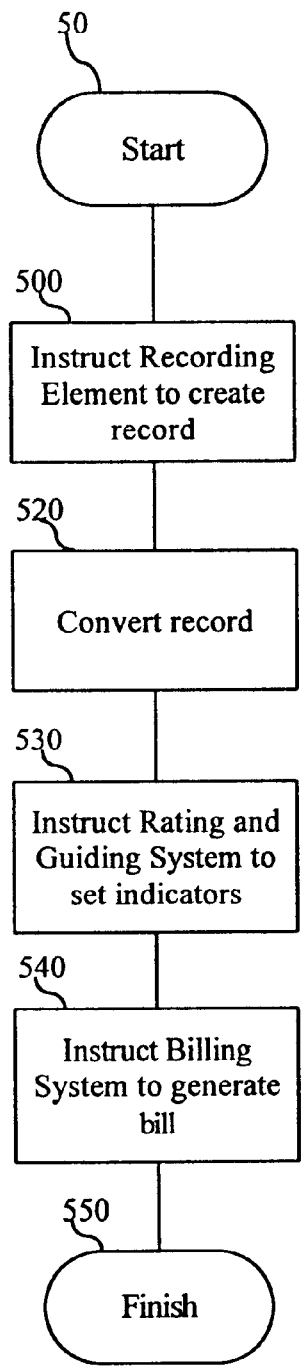
FIG. 5 is an exemplary flowchart outlining the operation of another embodiment of the service processing unit of FIG. 1.

FIG. 5 is an exemplary flowchart outlining the operation of another embodiment of the service processing unit 110 of FIG. 1. Once the service processing unit 110 is initiated in step 50, in step 500, the controller may instruct a recording element to create a record for a completed call. This record may be an Automatic Message Accounting (AMA) record, a call detail record or any other type of record that may be suitable for recording information for a completed call. When a call is made to a new or trial special service across the network 120, additional billing-related information may be contained in the record so that the controller may instruct a downstream billing system to recognize the record as one directed to a trial special service at step 540. Additional billing-related information that may be used by the billing system for printing a bill may include a "service name" literal, a service identifier, a "to number" literal, a "from number" literal, a "section heading" literal, the cost of a call, and/or a product or service code.

The additional information may be included in the record by the recording element. The additional information may be included in the record in the form of a new module or new multiple modules included in the record. The module may include new information and may be appended onto a base structure code in the record. In step 540, the controller may then instruct the billing system to process the record and associate the relevant call to the special service.

In step 520, the controller may convert the record into an appropriate format useful for billing. For example, the controller may convert the record into an Exchange Message Interface format. The record is then forwarded to a rating and guiding system in step 530. An example of a rating and guiding system is a Long Distance Service/Message Processing System which is a type of rating and guiding system used for consumer services. The controller may instruct the rating and guiding system to set appropriate indicators required for jurisdiction and taxation and may then send the record to downstream systems for bill rendering and journalization. In other words, the rating and guiding system may rate a record if needed. The controller may then instruct the rating and guiding system to guide the record to an appropriate billing system for bill generation in step 540. An example of a billing system used for billing customers is the residential account maintenance platform which is used for billing residential customers. The billing system may then recognize that the additional information from the original record indicates that charges for this record need to appear on a special section of a customer's bill. In step 550, the flowchart ends. The functions performed in the flowchart of FIG. 5 need not be performed by the controller. Alternatively, the functions may be performed by systems designated in the blocks of the flowchart.

As described above, the present invention provides for an apparatus and method for automatically processing charges for a telecommunications communication. The type of communication is automatically determined from a received record. Based on the determined type of communication, information indicating attributes of the communication is retrieved from the record. A bill is then generated that includes at least one new section that is generated exclusively from the information retrieved from the record. The new section includes information about communications to new services. Accordingly, a billing system does not have to be extensively reconfigured when a new special service is offered on a trial basis.

The method of this invention is preferably implemented on a programmed processor. However, service processing unit 110 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowchart shown in FIG. 5 can be used to implement the processor functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of processing charges for a telecommunications communication comprising:
   identifying a record as a record for a completed call using a new special service;
   retrieving billing-related information from the record corresponding to characteristics of the completed call to the new special service; and
   generating a new section on a bill whenever a customer uses the new special service, the new section generated exclusively from the billing-related information retrieved from the record, wherein the new section includes identification information that identifies the completed call as a call to the new special service and includes the billing-related information.

2. The method of claim 1, wherein the new special service is a service that is offered on a trial basis for a limited time.

3. The method of claim 1, wherein the record is identified as a record for a completed call to a new special service without prior notification that the new special service is being offered.

4. The method of claim 1, wherein the billing-related information includes a special service identifier, a section heading identifier, and a cost of the completed call and the new section on the bill includes the section heading identifier as a section heading on the bill and the cost of the completed call in a cost column on the bill.

5. The method of claim 1, wherein the record is identified as a call to a special service based on information located in a special service identifier field located within the record.

6. The method of claim 1, wherein the record comprises an automatic message accounting record or an exchange message interface record.

7. The method of claim 1, wherein the record comprises an automatic message accounting record and the method further comprises converting the automatic message accounting record to an exchange message interface record.

8. An apparatus for processing charges for a telecommunications communication comprising:
   a network interface; and a controller coupled to the network interface, the controller identifying a record as a record for a completed call using a new special service, retrieving billing-related information from the record corresponding to characteristics of the completed call to the new special service, and generating a new section on a bill whenever a customer uses the new service, the new section being generated exclusively from the billing-related information retrieved from the record, wherein the new section includes identification information that identifies the completed call as a call to the new special service and includes the billing-related information.

9. The apparatus of claim 8, wherein the new special service is a service that is offered on a trial basis for a limited time.

10. The apparatus of claim 8, wherein controller identifies the record as a record for a completed call to a new special service without prior notification that the new special service is being offered.

11. The apparatus of claim 8, wherein the billing-related information includes a special service identifier, a section heading identifier, and a cost of the completed call and the new section on the bill includes the section heading identifier as a section heading on the bill and the cost of the completed call in a cost column on the bill.

12. The apparatus of claim 8, wherein the controller identifies the record as a call to a special service based on information located in a special service identifier field located within the record.

13. The apparatus of claim 8, wherein the record comprises an automatic message accounting record or an exchange message interface record.

14. The apparatus of claim 8, wherein the record comprises an automatic message accounting record and the controller converts the automatic message accounting record to an exchange message interface record.

* * * * *